(12) United States Patent
Lv (10) Patent No.: US 12,022,177 B2
(45) Date of Patent: Jun. 25, 2024

(54) CAMERA MODULE WITH MULTI-CAMERA SWITCHING AND ELECTRONIC DEVICE

(71) Applicant: VIVO MOBILE COMMUNICATION CO., LTD., Dongguan (CN)

(72) Inventor: Zongan Lv, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 133 days.

(21) Appl. No.: 17/733,992

(22) Filed: Apr. 29, 2022

(65) Prior Publication Data

US 2022/0263984 A1    Aug. 18, 2022

Related U.S. Application Data

(63) Continuation of application No. PCT/CN2020/123880, filed on Oct. 27, 2020.

(30) Foreign Application Priority Data

Oct. 30, 2019    (CN) .......................... 201911044545.1

(51) Int. Cl.
*H04N 23/54* (2023.01)
*H04N 23/57* (2023.01)
(Continued)

(52) U.S. Cl.
CPC ............. *H04N 23/54* (2023.01); *H04N 23/57* (2023.01); *H04N 23/611* (2023.01); *H04N 23/667* (2023.01)

(58) Field of Classification Search
CPC ...... H04N 23/54; H04N 23/57; H04N 23/611; H04N 23/667; H04N 23/45; H04N 23/90;
(Continued)

(56) References Cited

U.S. PATENT DOCUMENTS 9,313,391 B1 *  4/2016  Zhang .................. H04N 23/611
9,594,434 B1    3/2017  Neglur
(Continued)

FOREIGN PATENT DOCUMENTS

CN        108270960 A        7/2018
CN        108540697 A        9/2018
(Continued)

OTHER PUBLICATIONS

International Search Report issued in corresponding International Application No. PCT/CN2020/123880, dated Jan. 22, 2021, 4 pages.
(Continued)

*Primary Examiner* — Mekonnen D Dagnew
(74) *Attorney, Agent, or Firm* — IPX PLLC (57) ABSTRACT

A camera module and an electronic device are provided. The camera module includes a first camera and a second camera. The first camera includes M first signal ends, and the second camera includes N second signal ends, where M and N are positive integers and M is greater than or equal to N. The M first signal ends are connected to the processor to form M lanes. The N second signal ends are one-to-one connected to N lanes among the M lanes. At least one second signal end is connected to a corresponding lane by a resistor.

12 Claims, 4 Drawing Sheets

(51) Int. Cl.
*H04N 23/611* (2023.01)
*H04N 23/667* (2023.01)

(58) Field of Classification Search
CPC .... H04N 23/50; H04M 1/0264; H04M 1/026; G06F 1/1686; G06F 1/1684
See application file for complete search history.

(56) References Cited

U.S. PATENT DOCUMENTS

| | | | |
|---|---|---|---|
| 2005/0078955 A1* | 4/2005 | Yamada | G03B 15/05 396/180 |
| 2012/0307229 A1* | 12/2012 | Conroy | H04N 25/745 356/5.1 |
| 2016/0212456 A1 | 7/2016 | Bohm et al. | |
| 2019/0073521 A1* | 3/2019 | Hsu | G06V 40/167 |

FOREIGN PATENT DOCUMENTS

| | | | |
|---|---|---|---|
| CN | 109729246 A | 5/2019 | |
| CN | 201307911 Y | 9/2019 | |
| CN | 110392149 A | 10/2019 | |

OTHER PUBLICATIONS

First Office Action issued in related Chinese Application No. 201911044545.1, dated Aug. 19, 2021, 7 pages.
Second Office Action issued in related Chinese Application No. 201911044545.1, dated Jan. 14, 2022, 8 pages.

* cited by examiner

CAMERA MODULE WITH MULTI-CAMERA SWITCHING AND ELECTRONIC DEVICE

CROSS-REFERENCE TO RELATED APPLICATIONS

This application is a continuation of International Application No. PCT/CN2020/123880, filed Oct. 27, 2020, which claims priority to Chinese Patent Application No. 201911044545.1, filed Oct. 30, 2019. The entire contents of each of the above-referenced applications are expressly incorporated herein by reference.

TECHNICAL FIELD

The present disclosure relates to the technical field of electronics, and in particular, to a camera module and an electronic device.

BACKGROUND

With the rapid development of electronic technology, electronic devices such as smartphones and tablets are increasingly popular, and have gradually become indispensable parts of people's daily life. In order to meet higher requirements on camera functions of an electronic device, the electronic device is usually equipped with a plurality of cameras currently. For example, one or more cameras are disposed on the front and rear sides of the electronic device, so as to meet photographing requirements in different scenarios and effectively enhance the quality of photographing.

In a case that the electronic device is equipped with a plurality of cameras, each camera usually transmits an image signal to an image processor through a Mobile Industry Processor Interface (MIPI). In addition, a switch unit (such as a single-pole multi-throw switch) is disposed between an MIPI transmit interface of the camera and an MIPI receive interface of the processor to control different cameras to photograph separately at different times in different scenarios. However, due to a large size, the switch unit usually occupies a large installation space on a circuit board of the electronic device. Under a circumstance that the area of the circuit board is limited, the switch unit leads to excessive compactness between components on the circuit board, thereby being detrimental to heat dissipation between the components of the electronic device, and being prone to cause damage to the electronic device.

Evidently, the electronic device equipped with a plurality of cameras currently incurs a problem of low reliability.

SUMMARY

Embodiments of the present disclosure provide a camera module and an electronic device to solve the problem of low reliability of an existing electronic device equipped with a plurality of cameras.

To solve the above problem, the embodiments of the present disclosure are implemented in the following way:

According to a first aspect, an embodiment of the present disclosure provides a camera module, applied to an electronic device including a processor. The camera module includes a first camera and a second camera. The first camera includes M first signal ends, and the second camera includes N second signal ends, where M and N are positive integers and M is greater than or equal to N.

The M first signal ends are connected to the processor to form M lanes.

The N second signal ends are one-to-one connected to N lanes among the M lanes, and at least one second signal end is connected to a corresponding lane by a resistor.

According to a second aspect, an embodiment of the present disclosure further provides an electronic device. The electronic device includes the camera module described above.

The camera module according to this embodiment of the present disclosure includes a first camera and a second camera. The first camera includes M first signal ends, and the second camera includes N second signal ends, where M and N are positive integers and M is greater than or equal to N. The M first signal ends are connected to the processor to form M lanes. The N second signal ends are one-to-one connected to N lanes among the M lanes. At least one second signal end is connected to a corresponding lane by a resistor. In this way, not only the first camera and the second camera can photograph separately at different times, but also the reflection of the signal transmitted when the first camera takes a photograph can be reduced, thereby improving the photographing quality of the camera module.

DETAILED DESCRIPTION

The following describes the technical solutions in the embodiments of the present disclosure clearly with reference to the accompanying drawings. Apparently, the described embodiments are merely some of but not all of the embodiments of the present disclosure. All other embodiments derived by a person of ordinary skill in the art based on the embodiments of the present disclosure without creative efforts shall fall within the protection scope of the present disclosure.

Figure 1:
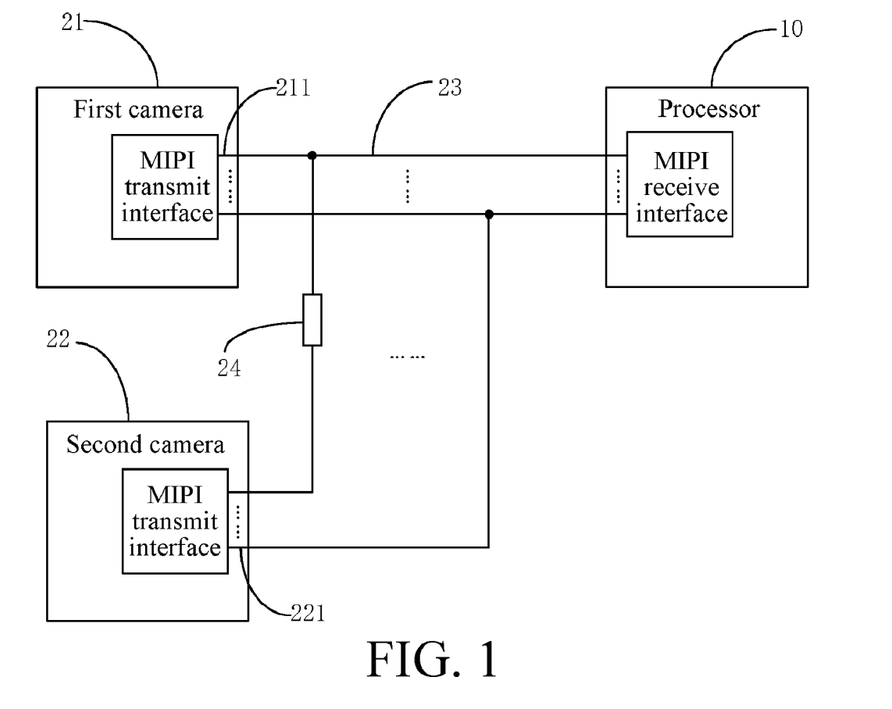
FIG. 1 is a first schematic structural diagram of a camera module according to an embodiment of the present disclosure.

Referring to FIG. 1, FIG. 1 is a schematic structural diagram of a camera module according to an embodiment of the present disclosure. The camera module is applied to an electronic device including a processor. As shown in FIG. 1, the camera module includes a first camera 21 and a second camera 22. The first camera 21 includes M first signal ends 211, and the second camera 22 includes N second signal ends 221, where M and N are positive integers and M is greater than or equal to N.

The M first signal ends 211 are connected to the processor 10 to form M lanes 23.

The N second signal ends 221 are one-to-one connected to N lanes 23 among the M lanes 23. At least one second signal end 221 is connected to a corresponding lane 23 by a resistor 24.

In the camera module herein, the signal end of the second camera 22 is connected to the corresponding lane 23 formed between the first camera 21 and the processor 10. In this way, when the first camera 21 and the second camera 22 take photographs at different times, the processor 10 can separately receive a signal transmitted by the first signal end 211 of the first camera 21 and a signal transmitted by the second signal end 221 of the second camera 22. In this way, the first camera 21 and the second camera 22 can photograph at different times without requiring a switch unit.

In addition, the second signal end 221 is connected to the lane 23 between the first signal end 211 and the processor 10. Therefore, when the first signal end 211 transmits the signal, the signal is transmitted to the second signal end 221 through a line between the lane 23 and the second signal end 221. Serving as a load, the second camera 22 causes signal reflection. The longer the line between the first signal end 211 and the second signal end 221, the more severe the signal reflection. The reflected signal affects the transmitted signal received by the processor 10, and leads to deterioration of a signal eye pattern of the first camera 21. With the resistor 24 disposed between the second signal end 221 and a corresponding lane 23, the transmitted signal of the first signal end 211 is reflected upon arrival at the resistor 24. Compared with the practice in which the transmitted signal is not reflected until arrival at the second signal end 221, the solution disclosed herein shortens the line length of transmission of the signal between the lane 23 and the second signal end 221, thereby reducing the reflection of the transmitted signal of the first signal end 211, improving the photographing quality of the first camera 21, and thereby improving the photographing quality of the camera module.

It is hereby noted that the M first signal ends 211 are signal ends of the MIPI transmit interface of the first camera 21, and each first signal end 211 may be a clock signal end configured to transmit a clock signal, or a data signal end configured to transmit a data signal, or the like. Similarly, the N second signal ends 221 may be signal ends of the MIPI transmit interface of the second camera 22, and each first signal end 211 may be a clock signal end or a data signal end or the like, without being limited herein.

In addition, the at least one second signal end 221 may be a part or all of the second signal ends 221 among the N second signal ends 221. For example, in a case that the N second signal ends 221 include a clock signal end, it is practicable that just the clock signal end is connected by the resistor 24. Alternatively, in some embodiments, among the N second signal ends 221, each second signal end 221 is connected to a corresponding lane by the resistor. In other words, the at least one second signal end 221 is the N second signal ends 221, thereby further reducing reflection of the signal of the first camera 21 and further improving the photographing quality of the first camera 21.

In some embodiments, a line length between a junction of a first lane 23 and the first signal end 211 connected to the first lane 23 is less than a line length between the junction and the second signal end 221 connected to the first lane 23.

The first lane 23 is any lane 23 of the N lanes 23.

Here, the line length between the first signal end 211 and the junction is less than the line length between the corresponding second signal end 221 and the junction. Therefore, if the transmitted signal of the first signal end 211 reaches the corresponding second signal end 221, severe reflection may occur. However, by disposing the resistor 24 between the corresponding second signal end 221 and the junction, the effect of reducing the signal reflection is more significant.

Certainly, the line length between the junction of the first lane 23 and the first signal end 211 connected to the first lane 23 may be equal to or greater than the line length between the junction and the second signal end 221 connected to the first lane 23 instead, without being limited herein.

In some embodiments, the target second signal end 221 is connected to the second lane 23 by a first resistor 24, and a first line length between the first resistor 24 and the target second signal end 221 is greater than a second line length, where:

the second line length is a line length between the first resistor 24 and the second lane 23; and the target second signal end 221 is any second signal end 221 of the at least one second signal end 221.

Similarly, because the first line length is greater than the second line length, the line length of transmission of the signal transmitted by the first signal end 211 corresponding to the target second signal end 221 can be further shortened between the second lane 23 and the target second signal end 221, thereby further reducing the reflection of the transmitted signal of the first signal end 211.

Certainly, the first line length may be less than or equal to the second line length instead, without being limited herein.

It is hereby noted that when the second signal end 221 of the second camera 22 transmits a signal, the transmitted signal also reaches the first camera 21 to generate a reflected signal, thereby deteriorating the eye pattern of the signal of the second camera 22. Therefore, in some embodiments, in order to reduce the impact caused by the reflected signal to the photographing quality of the second camera 22, the first camera 21 and the second camera 22 satisfy at least one of the following:

the number of pixels per inch of the second camera 22 is lower than the number of pixels per inch of the first camera 21;

a signal frequency of the second camera 22 is lower than a signal frequency of the first camera 21; and a transmission rate of the second camera 22 is lower than a transmission rate of the first camera 21.

In this embodiment of the present disclosure, the number of the first signal ends 211 may be the same as the number of the second signal ends 221. That is, M is equal to N.

Figure 2:
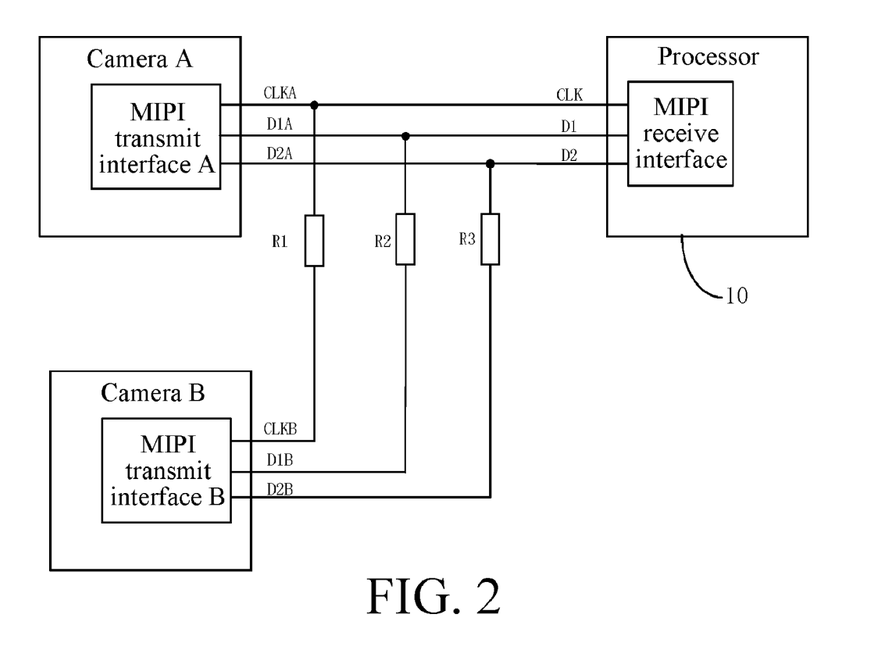
FIG. 2 is a second schematic structural diagram of a camera module according to an embodiment of the present disclosure.

Exemplarily, as shown in FIG. 2, the camera module includes a camera A (equivalent to the first camera 21), a camera B (equivalent to the second camera 22), and a resistor module. The camera B is a low-pixel-per-inch camera, and the camera A may be a high-pixel-per-inch camera, or a low-pixel-per-inch camera with a lower number of pixels per inch than the camera B.

The MIPI transmit interface A of the camera A includes a clock signal end CLKA, a data signal end D1A, and a data signal end D2A (equivalent to M first signal ends 211, where M is equal to 3). The clock signal end CLKA, the data signal end D1A, and the data signal end D2A are connected to the MIPI receive interface of the processor 10. The clock signal end CLKA is connected to a clock signal end CLK of the MIPI receive interface. The data signal end D1A is connected to a data signal end D1 of the MIPI receive interface. The data signal end D2A is connected to a data signal end D2 of the MIPI receive interface. In this way, three lanes 23 are formed.

The resistor module includes a resistor R1, a resistor R2, and a resistor R3. The resistance values of the resistor R1, the resistor R2, and the resistor R3 may range from 5Ω to 200Ω.

The MIPI transmit interface B of the camera B includes a clock signal end CLKB, a data signal end D1B, and a data signal end D2B (equivalent to N second signal ends 221, where N is equal to 3). The clock signal end CLKB is connected to the lane 23 between the clock signal end CLKA and the clock signal end CLK by the resistor R1. The data signal end D1B is connected to the lane 23 between the data signal end D1A and the data signal end D1 by the resistor R2. The data signal end D2B is connected to the lane 23 between the data signal end D2A and the data signal end D2 by the resistor R3 (that is, the at least one second signal end 221 includes the clock signal end CLKB, the data signal end D1B, and the data signal end D2B). The resistor module is disposed close to the camera A.

An electrical signal including image information, which is collected by the camera A and the camera B, is transmitted to the processor 10 through the MIPI interface. The MIPI transmit interface A and the MIPI transmit interface B are output ends, and the MIPI receive interface is an input end. The foregoing traces of the MIPI transmit interface A and the MIPI transmit interface B are electrically connected. CLKA, D1A, D2A, CLK, D1, D2, CLKB, D1B, and D2B are net names of MIPI differential pair traces. One differential pair trace includes two MIPI traces: a P trace and a N trace. All MIPI traces connected to the same common node are electrically connected. One end of the resistor module is connected to the MIPI transmit interface B, and the other end is connected to the common node.

Figure 3A:
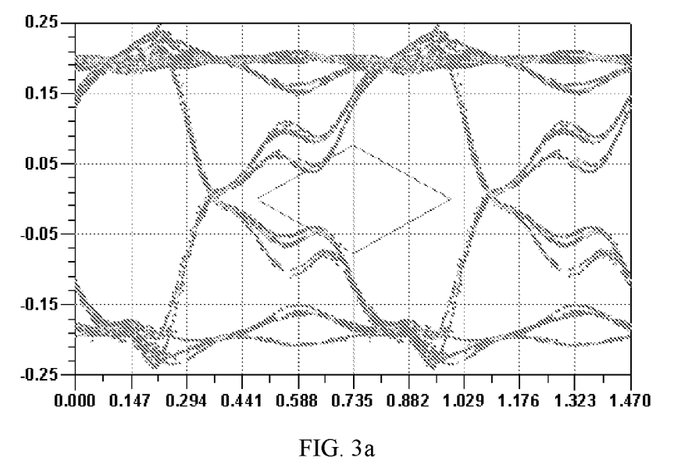
FIG. 3*a* is a first eye pattern of signals of a first camera according to an embodiment of the present disclosure.
Figure 3B:
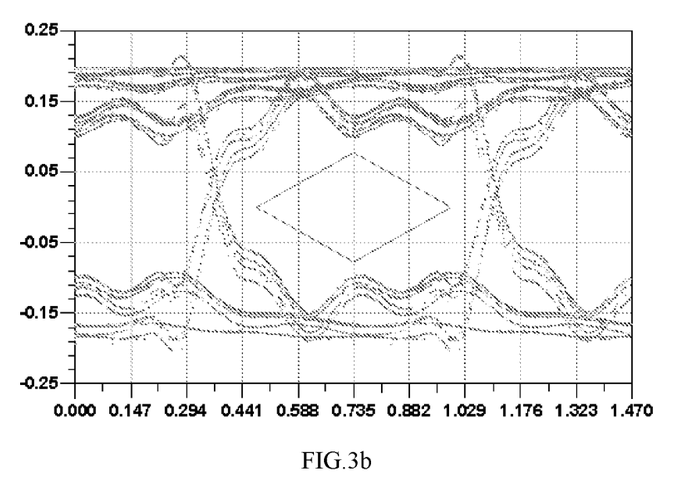
FIG. 3*b* is a second eye pattern of signals of a first camera according to an embodiment of the present disclosure.

When the camera A is working, the camera B is in a standby or power-off state. In this case, CLKA, D1A, D2A, CLK, D1, and D2 are MIPI main lanes, and CLKB, D1B, and D2B are MIPI branch lanes. The MIPI transmit interface A transmits a signal to the MIPI receive interface through the MIPI main lane. In this case, the signal reflected by the MIPI branch trace is superimposed on the signal in the MIPI main lane, thereby deteriorating the signal eye pattern of the MIPI receive interface (for example, FIG. 3a is a signal eye pattern of the camera A without a resistor module). The function of the resistor module 14 is to reduce the reflection in the branch trace, and improve the eye pattern at the position of the MIPI receive interface. FIG. 3b is a signal eye pattern of the camera A with a resistor module disposed. When the MIPI rate of the camera A is relatively high and the MIPI branch trace is relatively long, the signal eye pattern at the position of the MIPI receive interface can still meet the standard requirements by virtue of the resistor module 14.

Figure 3C:
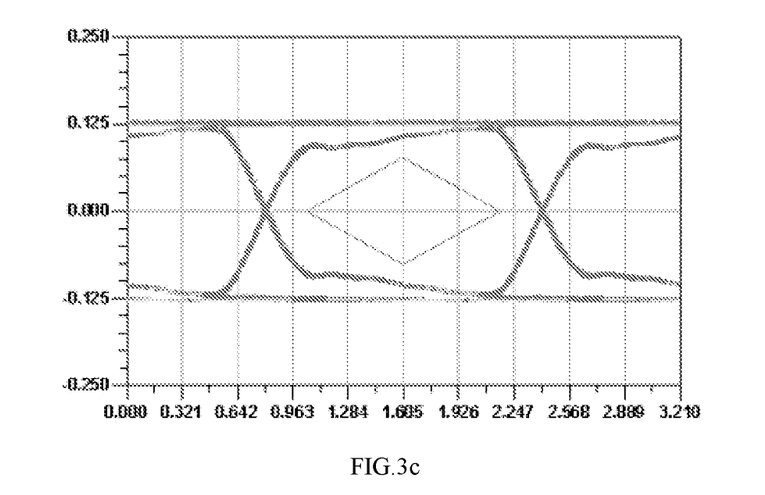
FIG. 3*c* is an eye pattern of signals of a second camera according to an embodiment of the present disclosure.

When the camera B is working, the camera A is in a standby or power-off state. In this case, CLKB, D1B, D2B, CLK, D1, and D2 are MIPI main lanes, and CLKA, D1A, and D2A are MIPI branch lanes. The MIPI transmit interface B transmits a signal to the MIPI receive interface through the MIPI main lane. In this case, the signal reflected by the MIPI branch trace is superimposed on the signal in the MIPI main lane, thereby deteriorating the signal eye pattern of the MIPI receive interface. The camera B may be a low-pixel-per-inch camera, so that the MIPI rate is low, the branch trace is relatively short, and the signal reflection is relatively low. As can be seen from the signal eye pattern of the camera B shown in FIG. 3c, after a resistor 24 is serially connected onto the MIPI main lane, the signal eye pattern at the position of the MIPI receive interface can still meet the standard requirements.

It is hereby noted that, in the case that M is equal to N, the camera A and the camera B may include other numbers of signal ends, as exemplified by the following Scheme I and Scheme II:

Scheme I: The MIPI transmit interface A of the camera A includes a clock signal end and 1 data signal end (M=2). The MIPI transmit interface B of the camera B includes a clock signal end and 1 data signal end (N=2). In this case, the resistor module includes 3 resistors 24, and the MIPI receive interface of the processor 10 includes a clock signal end and 1 data signal end.

Figure 4:
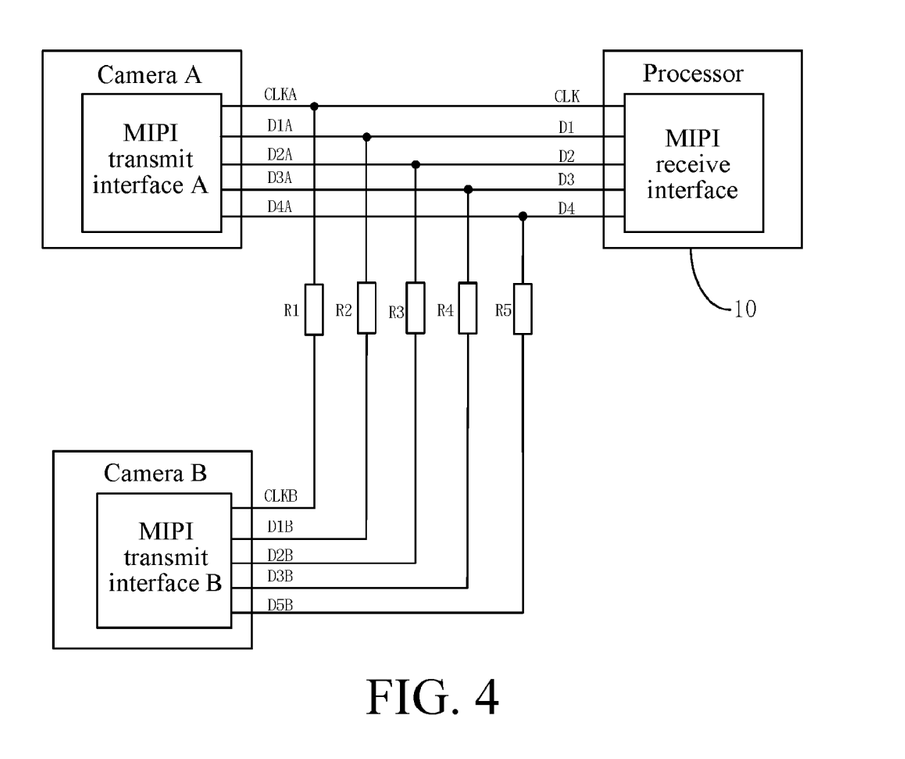
FIG. 4 is a third schematic structural diagram of a camera module according to an embodiment of the present disclosure.

Scheme II: The MIPI transmit interface A of the camera A includes a clock signal end and 4 data signal ends (M=5). The MIPI transmit interface B of the camera B includes a clock signal end and 4 data signal ends (N=5). In this case, the resistor module includes 5 resistors 24, and the MIPI receive interface of the processor 10 includes a clock signal end and 4 data signal ends, as shown in FIG. 4.

Certainly, the number of the first signal ends 211 may be different from the number of the second signal ends 221, that is, M is greater than N, as exemplified by the following schemes III to V:

Scheme III: The MIPI transmit interface A of the camera A includes a clock signal end and 2 data signal ends (M=3). The MIPI transmit interface B of the camera B includes a clock signal end and 1 data signal end (N=2). In this case, the resistor module includes 2 resistors 24, and the MIPI receive interface of the processor 10 includes a clock signal end and 2 data signal ends.

Scheme IV: The MIPI transmit interface A of the camera A includes a clock signal end and 4 data signal ends (M=5). The MIPI transmit interface B of the camera B includes a clock signal end and 1 data signal end (N=2). In this case, the resistor module includes 2 resistors 24, and the MIPI receive interface of the processor 10 includes a clock signal end and 4 data signal ends.

Scheme V: The MIPI transmit interface A of the camera A includes a clock signal end and 4 data signal ends (M=5). The MIPI transmit interface B of the camera B includes a clock signal end and 2 data signal ends (N=3). In this case, the resistor module includes 3 resistors 24, and the MIPI receive interface of the processor 10 includes a clock signal end and 4 data signal ends.

It is hereby noted that the camera module may include other cameras in addition to the first camera 21 and the second camera 22, for example, may include a camera that works simultaneously with the first camera 21, or the like.

In some embodiments, the M first signal ends 211 include a first clock signal end, the N lanes 23 include a third lane 23 connected to the first clock signal end. The N second signal ends 221 include a second clock signal end, and the second clock signal end is connected to the third lane 23 by a second resistor 24. The camera module further includes a third camera that includes K third signal ends, and the third clock signal end among the K third signal ends is connected to the third lane 23. The (K−1) third signal ends other than the third clock signal end are connected to the lane 23 between the first signal end 211 and the processor 10 respectively, and at least one third signal end is connected to a corresponding lane 23 by the resistor 24 respectively, where K is a positive integer. In this way, in a case that the camera module includes more than two cameras, the reflection of the signal transmitted by the first camera 21 can be reduced, and the photographing quality of the first camera 21 can be improved.

It is hereby noted that the lane 23 connected to the third signal end may be the same as or different from the lane 23 connected to the second signal end 221. In addition, the principles of interoperability between the third camera and the first camera 21 and the second camera 22 are similar to those between the first camera 21 and the second camera 22, and are omitted herein.

Figure 5:
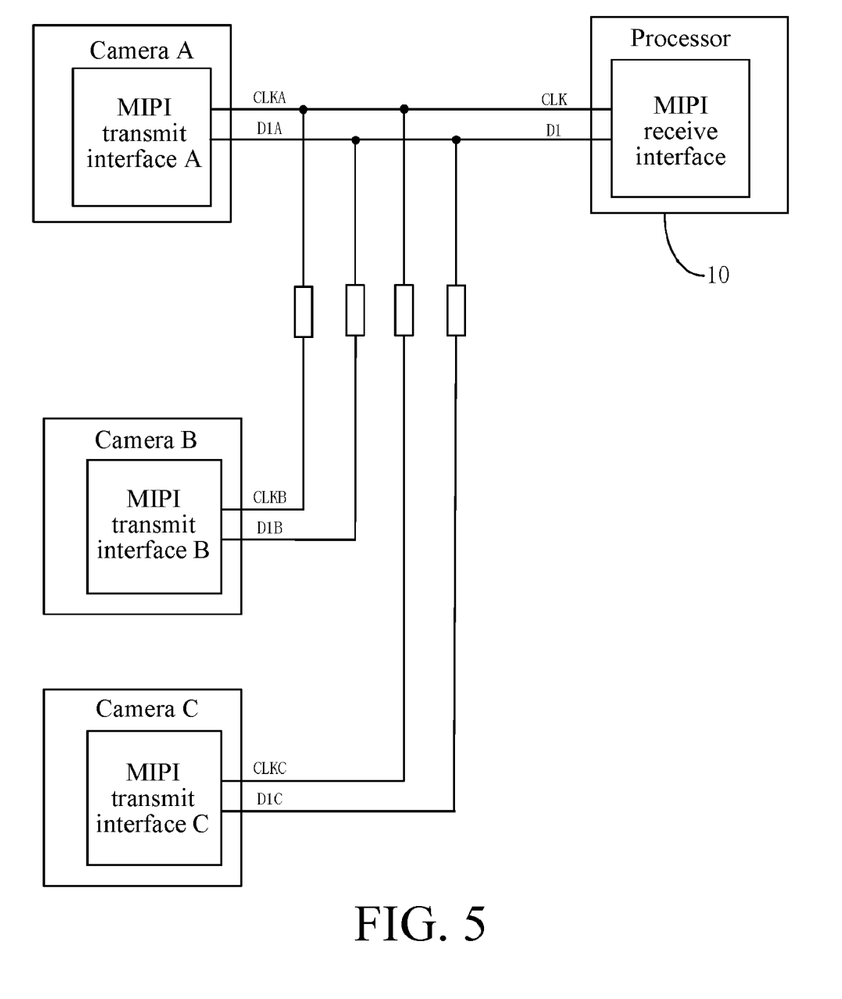
FIG. 5 is a fourth schematic structural diagram of a camera module according to an embodiment of the present disclosure.

Exemplarily, Schemes VI to XV are provided below to describe a scenario in which the camera module includes the first camera 21, the second camera 22, and the third camera, as detailed below:

Scheme VI: The MIPI transmit interface A of the camera A includes a clock signal end and 1 data signal end (M=2). The MIPI transmit interface B of the camera B includes a clock signal end and 1 data signal end (N=2). The MIPI transmit interface C of the camera C (that is, the third camera) includes a clock signal end and 1 data signal end (N=2). In this case, the resistor module includes 4 resistors 24, and the MIPI receive interface of the processor 10 includes a clock signal end and 1 data signal end, as shown in FIG. 5.

Scheme VII: The MIPI transmit interface A of the camera A includes a clock signal end and 2 data signal ends (M=3). The MIPI transmit interface B of the camera B includes a clock signal end and 2 data signal ends (N=3). The MIPI transmit interface C of the camera C (that is, the third camera) includes a clock signal end and 1 data signal end (N=2). In this case, the resistor module includes 5 resistors 24, and the MIPI receive interface of the processor 10 includes a clock signal end and 2 data signal ends.

Scheme VIII: The MIPI transmit interface A of the camera A includes a clock signal end and 4 data signal ends (M=5). The MIPI transmit interface B of the camera B includes a clock signal end and 4 data signal ends (N=5). The MIPI transmit interface C of the camera C (that is, the third camera) includes a clock signal end and 1 data signal end (N=2). In this case, the resistor module includes 7 resistors 24, and the MIPI receive interface of the processor 10 includes a clock signal end and 4 data signal ends.

Scheme IX: The MIPI transmit interface A of the camera A includes a clock signal end and 2 data signal ends (M=3). The MIPI transmit interface B of the camera B includes a clock signal end and 1 data signal ends (N=2). The MIPI transmit interface C of the camera C (that is, the third camera) includes a clock signal end and 2 data signal ends (N=3). In this case, the resistor module includes 5 resistors 24, and the MIPI receive interface of the processor 10 includes a clock signal end and 2 data signal ends.

Scheme X: The MIPI transmit interface A of the camera A includes a clock signal end and 2 data signal ends (M=3). The MIPI transmit interface B of the camera B includes a clock signal end and 2 data signal ends (N=3). The MIPI transmit interface C of the camera C (that is, the third camera) includes a clock signal end and 2 data signal ends (N=3). In this case, the resistor module includes 6 resistors 24, and the MIPI receive interface of the processor 10 includes a clock signal end and 2 data signal ends.

Scheme XI: The MIPI transmit interface A of the camera A includes a clock signal end and 4 data signal ends (M=5). The MIPI transmit interface B of the camera B includes a clock signal end and 4 data signal ends (N=5). The MIPI transmit interface C of the camera C (that is, the third camera) includes a clock signal end and 2 data signal ends (N=3). In this case, the resistor module includes 8 resistors 24, and the MIPI receive interface of the processor 10 includes a clock signal end and 4 data signal ends.

Scheme XII: The MIPI transmit interface A of the camera A includes a clock signal end and 4 data signal ends (M=5). The MIPI transmit interface B of the camera B includes a clock signal end and 1 data signal end (N=2). The MIPI transmit interface C of the camera C (that is, the third camera) includes a clock signal end and 4 data signal ends (N=5). In this case, the resistor module includes 7 resistors 24, and the MIPI receive interface of the processor 10 includes a clock signal end and 4 data signal ends.

Scheme XIII: The MIPI transmit interface A of the camera A includes a clock signal end and 4 data signal ends (M=5). The MIPI transmit interface B of the camera B includes a clock signal end and 2 data signal ends (N=3). The MIPI transmit interface C of the camera C (that is, the third camera) includes a clock signal end and 4 data signal ends (N=5). In this case, the resistor module includes 8 resistors 24, and the MIPI receive interface of the processor 10 includes a clock signal end and 4 data signal ends.

Scheme XIV: The MIPI transmit interface A of the camera A includes a clock signal end and 4 data signal ends (M=5). The MIPI transmit interface B of the camera B includes a clock signal end and 4 data signal ends (N=5). The MIPI transmit interface C of the camera C (that is, the third camera) includes a clock signal end and 4 data signal ends (N=5). In this case, the resistor module includes 10 resistors 24, and the MIPI receive interface of the processor 10 includes a clock signal end and 4 data signal ends.

In this embodiment of the present disclosure, the camera module includes a first camera 21 and a second camera 22. The first camera 21 includes M first signal ends 211, and the second camera 22 includes N second signal ends 221, where M and N are positive integers and M is greater than or equal to N. The M first signal ends 211 are connected to the processor 10 to form M lanes 23. The N second signal ends 221 are one-to-one connected to N lanes 23 among the M lanes 23. At least one second signal end 221 is connected to a corresponding lane 23 by the resistor 24. In this way, not only the first camera 21 and the second camera 22 can photograph separately at different times, but also the reflection of the signal transmitted when the first camera 21 takes a photograph can be reduced, thereby improving the photographing quality of the camera module.

Based on the foregoing camera module, an embodiment of the present disclosure further provides an electronic device. The electronic device includes the camera module described above.

The structure of the electronic device can be learned from the prior art, and the camera module has been described in detail in the foregoing embodiments. Therefore, the specific structure of the electronic device in this embodiment is omitted herein.

The foregoing descriptions are merely specific implementations of the present disclosure, but are not intended to limit the protection scope of the present disclosure. Any variation or replacement readily derivable by a person skilled in the art without departing from the technical scope of the present disclosure shall fall within the protection scope of the present disclosure. Therefore, the protection scope of the present disclosure is subject to the protection scope of the claims.

What is claimed is:

1. A camera module, included in an electronic device comprising a processor, wherein the camera module comprises a first camera and a second camera, wherein the first camera comprises M first signal ends, and the second camera comprises N second signal ends, wherein M and N are positive integers, and M is greater than or equal to N, wherein:
   the M first signal ends are connected to the processor to form M separate lanes; and
   the N second signal ends are one-to-one connected to N separate lanes among the M separate lanes, and each second signal end is connected to a corresponding lane by a resistor not connected to other (N−1) lanes.

2. The camera module according to claim 1, wherein a line length between a junction of a first lane and a first signal end connected to the first lane is less than a line length between the junction and a second signal end connected to the first lane; and
   the first lane is any one of the N separate lanes.

3. The camera module according to claim 2, wherein a target second signal end is connected to a second lane by a first resistor, and a first line length between the first resistor and the target second signal end is greater than a second line length, wherein:
   the second line length is: a line length between the first resistor and the second lane; and
   the target second signal end is any one of the N second signal ends.

4. The camera module according to claim 1, wherein the first camera and the second camera satisfy at least one of the following:
   a number of pixels per inch of the second camera is lower than a number of pixels per inch of the first camera;
   a signal frequency of the second camera is lower than a signal frequency of the first camera; or
   a transmission rate of the second camera is lower than a transmission rate of the first camera.

5. The camera module according to claim 1, wherein the M first signal ends comprise a first clock signal end, and the N separate lanes comprise a third lane connected to the first clock signal end;
   the N second signal ends comprise a second clock signal end, and the second clock signal end is connected to the third lane by a second resistor;
   the camera module further comprises a third camera comprising K third signal ends, and a third clock signal end in the K third signal ends is connected to the third lane; and
   (K−1) third signal ends other than the third clock signal end are connected to lanes between the first signal ends and the processor respectively, and at least one of the third signal ends is connected to a corresponding lane by the resistor respectively, wherein K is a positive integer.

6. The camera module according to claim 1, wherein among the N second signal ends, each second signal end is connected to a corresponding lane by the resistor.

7. An electronic device, comprising a processor and a camera module, wherein the camera module comprises a first camera and a second camera, wherein the first camera comprises M first signal ends, the second camera comprises N second signal ends, wherein M and N are positive integers, and M is greater than or equal to N, wherein:
   the M first signal ends are connected to the processor to form M separate lanes; and
   the N second signal ends are one-to-one connected to N separate lanes among the M separate lanes, and each second signal end is connected to a corresponding lane by a resistor not connected to other (N−1) lanes.

8. The electronic device according to claim 7, wherein a line length between a junction of a first lane and a first signal end connected to the first lane is less than a line length between the junction and a second signal end connected to the first lane; and
   the first lane is any one of the N separate lanes.

9. The electronic device according to claim 8, wherein a target second signal end is connected to a second lane by a first resistor, and a first line length between the first resistor and the target second signal end is greater than a second line length, wherein:
   the second line length is: a line length between the first resistor and the second lane; and
   the target second signal end is any one of the N second signal ends.

10. The electronic device according to claim 7, wherein the first camera and the second camera satisfy at least one of the following:
    a number of pixels per inch of the second camera is lower than a number of pixels per inch of the first camera;
    a signal frequency of the second camera is lower than a signal frequency of the first camera; or
    a transmission rate of the second camera is lower than a transmission rate of the first camera.

11. The electronic device according to claim 7, wherein the M first signal ends comprise a first clock signal end, and the N separate lanes comprise a third lane connected to the first clock signal end;
    the N second signal ends comprise a second clock signal end, and the second clock signal end is connected to the third lane by a second resistor;
    the camera module further comprises a third camera comprising K third signal ends, and a third clock signal end in the K third signal ends is connected to the third lane; and
    (K−1) third signal ends other than the third clock signal end are connected to lanes between the first signal ends and the processor respectively, and at least one of the third signal ends is connected to a corresponding lane by the resistor respectively, wherein K is a positive integer.

12. The electronic device according to claim 7, wherein among the N second signal ends, each second signal end is connected to a corresponding lane by the resistor.

* * * * *